US007372225B2

(12) United States Patent
Murphy et al.

(10) Patent No.: US 7,372,225 B2
(45) Date of Patent: May 13, 2008

(54) BARRIER OPERATOR WITH FLEXIBLE DRIVE MEMBER

(75) Inventors: Larry D. Murphy, North Canton, OH (US); Aaron J. Potts, Carrollton, OH (US); Daniel G. Stafford, North Canton, OH (US)

(73) Assignee: Overhead Door Corporation, Lewisville, TX (US)

( * ) Notice: Subject to any disclaimer, the term of this patent is extended or adjusted under 35 U.S.C. 154(b) by 0 days.

(21) Appl. No.: 11/362,668

(22) Filed: Feb. 27, 2006

(65) Prior Publication Data

US 2007/0200519 A1 Aug. 30, 2007

(51) Int. Cl.
*H02P 1/00* (2006.01)

(52) U.S. Cl. ...................... 318/280; 318/254; 318/439; 318/445

(58) Field of Classification Search ................ 318/280, 318/138, 254, 434, 445, 466, 468; 160/201, 160/190, 199, 188
See application file for complete search history.

(56) References Cited

U.S. PATENT DOCUMENTS 1,216,202 A 2/1917 Boughton
4,887,658 A * 12/1989 Cloutier ...................... 160/190
5,572,829 A 11/1996 Stoltenberg
5,803,149 A 9/1998 Halley et al.
6,257,303 B1 7/2001 Coubray et al.
6,276,744 B1 8/2001 Huber et al.
6,326,751 B1 12/2001 Mullet et al.
6,779,306 B2 8/2004 Hormann
6,883,579 B2 4/2005 Olmsted

OTHER PUBLICATIONS

NovoPort Door Operator Instructions and Brochure, 20 pp., Novoferm GmbH, Hanover, Germany, Sep. 2002.

* cited by examiner

*Primary Examiner*—Karen Masih
(74) *Attorney, Agent, or Firm*—Gardere Wynne Sewell LLP

(57) ABSTRACT

A motorized operator for moving a barrier, such as an upward acting garage door, between open and closed positions includes a support mounted adjacent one of a pair of barrier guide tracks or along a barrier counterbalance shaft and a drive mechanism mounted on the support and engaged with an elongated flexible member, such as a chain, cable or cog belt. A cog belt, for example, is connected to a drawbar connected to the barrier at one end and the belt is either connected directly to the barrier at the opposite end or to a storage reel supported for rotation on and with a shaft of a barrier counterbalance mechanism. The storage reel may include a spiral groove and be supported on the counterbalance shaft for axial translation to receive and dereel the belt as the barrier is moved between open and closed positions. One or more belt tensioning pulleys may be mounted on the support.

31 Claims, 12 Drawing Sheets

FIG. 14
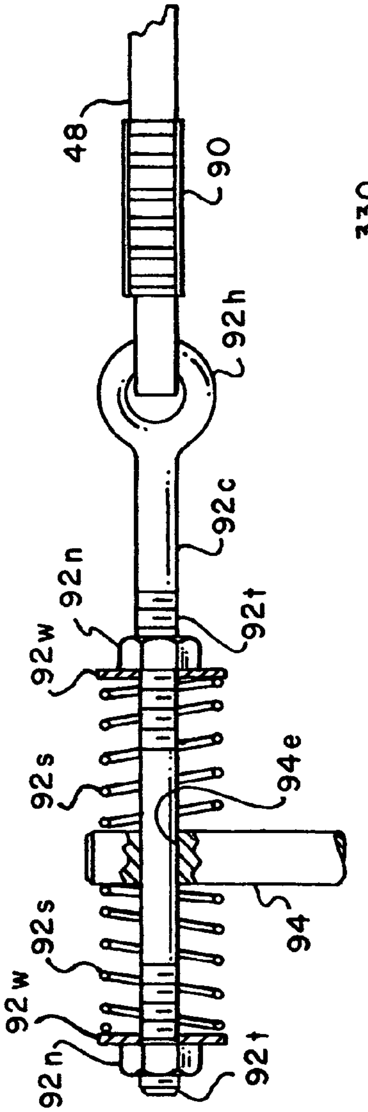
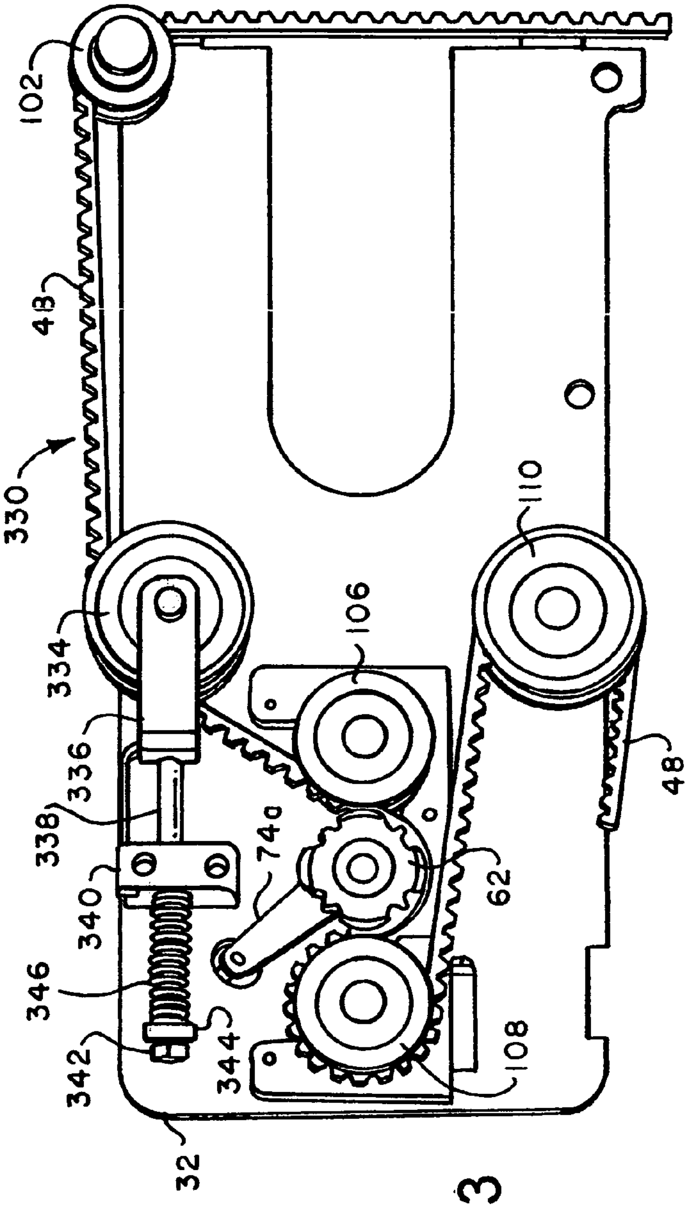
FIG. 13

BARRIER OPERATOR WITH FLEXIBLE DRIVE MEMBER

BACKGROUND OF THE INVENTION

In the art of barrier operators for moving vehicle barriers, such as upward acting garage doors, there have been developments directed toward providing a lightweight, efficient operator with various control features. One desired feature for a barrier operator, including an operator for an upward acting sectional garage door, is to provided as compact a device or apparatus as possible and one which does not require mounting the operator to an overhead structure, such as the garage ceiling. Also considered desirable is an operator which does not occupy space between the horizontal or curved portions of the spaced apart barrier guide tracks. Another desired feature in barrier operators, generally of the type described herein, is the provision of an operator mechanism which may be easily disconnected in the event of a malfunction, but also minimizes the chance of unwanted forcing of the barrier from a closed position to an open position. Still further desiderata include low cost of installation, quiet operation and ease of maintenance or replacement, if needed. The above-mentioned features, as well as other advantages, are provided by the present invention.

SUMMARY OF THE INVENTION

The present invention provides an improved barrier operator, particularly an operator for controlling movement of a sectional upward acting garage door.

In accordance with one aspect of the present invention, a barrier operator is provided which includes a drive mechanism which may be mounted on a bracket or support member adjacent one side of the barrier and adjacent an associated barrier guide and support track. In particular, the barrier operator is adapted for mounting adjacent and above the barrier and may be connected to support brackets which are adapted to support a counterbalance shaft and associated cable drums and the like. The operator may, in fact, include a support bracket mountable adjacent opposite side edges of a sectional upward acting barrier or door or along a counterbalance shaft and near the support structure for such a shaft.

In accordance with another aspect of the present invention, a barrier operator is provided which is characterized by a drive mechanism including a drive motor which is operable to be drivably engaged with an elongated flexible member, such as a cog belt, chain or cable and which provides quiet and reliable operation. The use of a flexible cog belt, in particular, minimizes the need for routine maintenance or lubrication of the operator mechanism, such as is normally required for endless chain and rotatable power screw type operators, for example.

In accordance with yet a further aspect of the present invention, a barrier operator is provided which is characterized by an elongated flexible member, such as a cog belt, drivenly connected to a drive mechanism powered by a reversible electric motor and wherein opposite ends of the flexible drive member are operably connected to the barrier to provide positive movement of the barrier in both opening and closing directions of movement. The flexible drive member is advantageously tensioned by a tensioning spring interconnecting the flexible drive member with the barrier at one or both ends or wherein the flexible drive member is trained over resiliently biased idler wheels or pulleys which maintain proper tension in the drive member.

In one preferred embodiment of the invention, the flexible drive member is connected to a drawbar at one end which, in turn, is connected to a barrier panel at an upper portion thereof, the drawbar preferably being supported in guide rollers which are disposed in one of the barrier guide tracks. The opposite end of the flexible drive member is connected to a lower edge of the lowermost barrier panel. The flexible drive member is also trained over one or more idler pulleys which maintain the flexible drive member in driving engagement with a motor driven drive pulley or the like. The operator assists movement of the barrier or door between open and closed positions by a counterbalance system including an elongated shaft supporting rotatable drums or the like which are operable to connect to the barrier by way, of elongated flexible counterbalance members, such as cables.

Another preferred embodiment of the invention utilizes a drive member storage reel keyed for rotation with a counterbalance shaft of a counterbalance mechanism for an upward acting barrier or the like. One end of the flexible drive member is connected to the reel for storing the drive member thereon and for drivingly engaging the barrier by way of the counterbalance system for moving the barrier from a closed to an open position. The opposite end of the flexible drive member or belt is connected to the upper end of the barrier by way of the aforementioned drawbar for moving the barrier from an open position toward a closed position. The flexible member storage reel may be arranged to store plural wraps of the flexible drive member one on top of the other in spiral fashion or a storage reel may be provided with a helical groove or recess extending axially therealong for storing the flexible drive member thereon. The helical groove storage reel is mounted for axial translation on but rotatable with a counterbalance shaft connected to spaced apart counterbalance cable drums generally in the same manner as the other embodiments of the invention. The helical groove storage reel is translated axially in timed relation with the requirement to store wraps of the flexible drive member thereon by a finger engaged with helical lands defining the groove in which the flexible drive member is disposed as it is wrapped on and off of the storage reel.

Those skilled in the art will further appreciate the above-mentioned advantages and superior features of the invention together with other important aspects thereof upon reading the detailed description which follows in conjunction with the drawings.

BRIEF DESCRIPTION OF THE DRAWINGS

FIG. 13 is a perspective view of an embodiment of the invention showing other drive member tensioning mechanisms; and FIG. 14 is a detail view of a tensioning mechanism for use on either end of the flexible drive member.

DETAILED DESCRIPTION OF THE PREFERRED EMBODIMENTS

Figure 1:
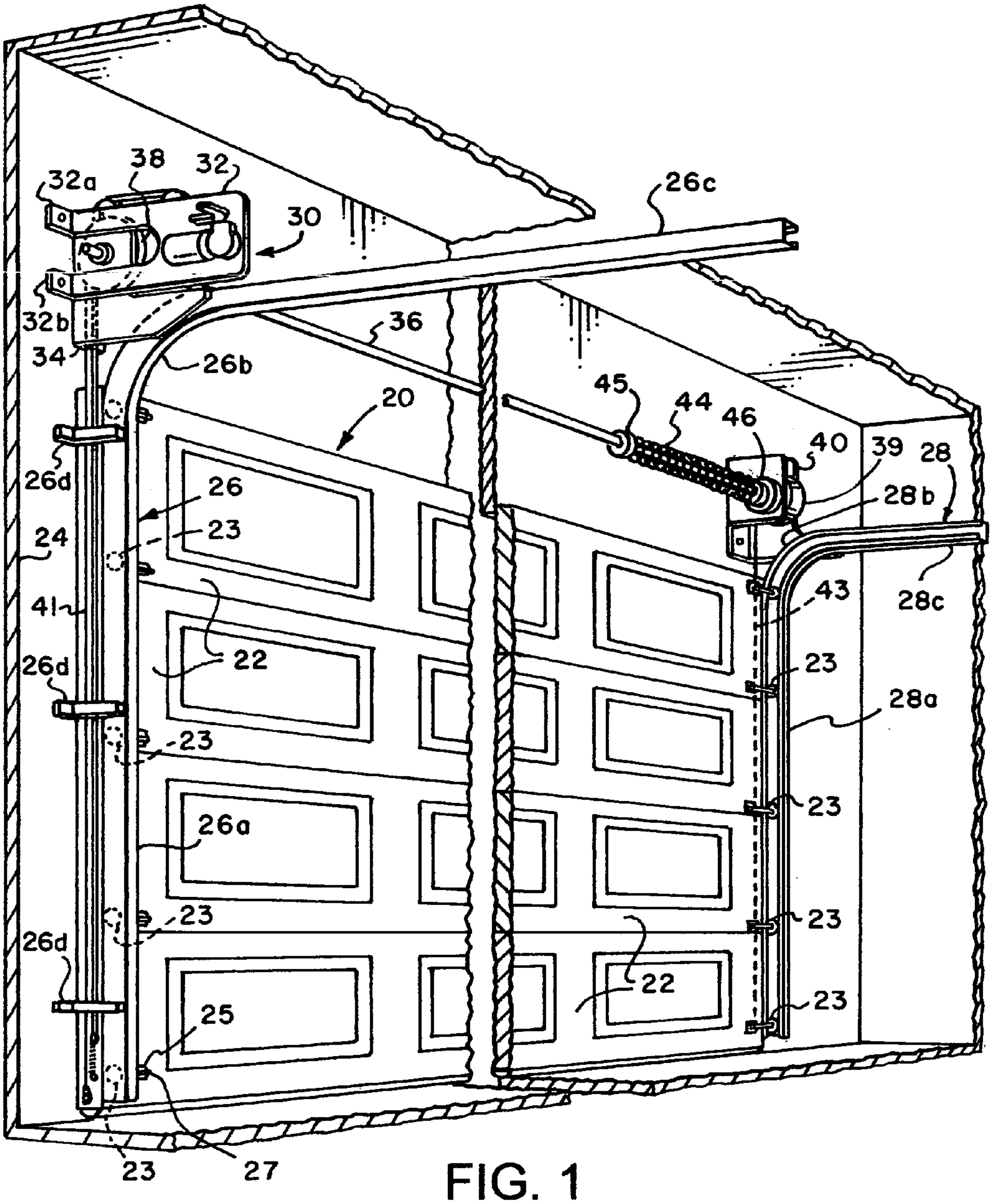
FIG. 1 is a perspective view of a barrier comprising a sectional upward acting garage door including the operator of the present invention.

In the description which follows, like parts are marked throughout the specification and drawings with the same reference numerals, respectively. The drawing figures are not necessarily to scale and some elements may be shown exaggerated in scale or in somewhat generalized or schematic form in the interest of clarity and conciseness.

Referring to FIG. 1, there is illustrated a movable barrier 20, shown by way of example as an upward acting sectional garage door, including plural hingedly interconnected door sections 22 which may be of a type described in U.S. Pat. No. 6,626,226 to Whitley and assigned to the assignee of the present invention. The barrier or door 20 is shown closed over a door opening formed in a wall 24 and is guided for movement between the closed position shown and an open position by respective guide track assemblies 26 and 28. Guide track assembly 26 includes a vertical track section 26*a*, a curved transition section 26*b* and a horizontally extending section 26*c*. In like manner, guide track assembly 28 includes a vertically extending section 28*a*, a curved transition section 28*b* and a generally horizontally extending track section 28*c*. The guide track assemblies 26 and 28 are suitably secured to wall 24 by brackets 26*d*, for example, as shown in FIG. 1. The track assemblies 26 and 28 may be like those described in one or more of U.S. Pat. Nos. 6,554,047 and 6,745,814 to Mondragon et al. and Hoofard et al., respectively, and also assigned to the assignee of the present invention.

Figure 4:
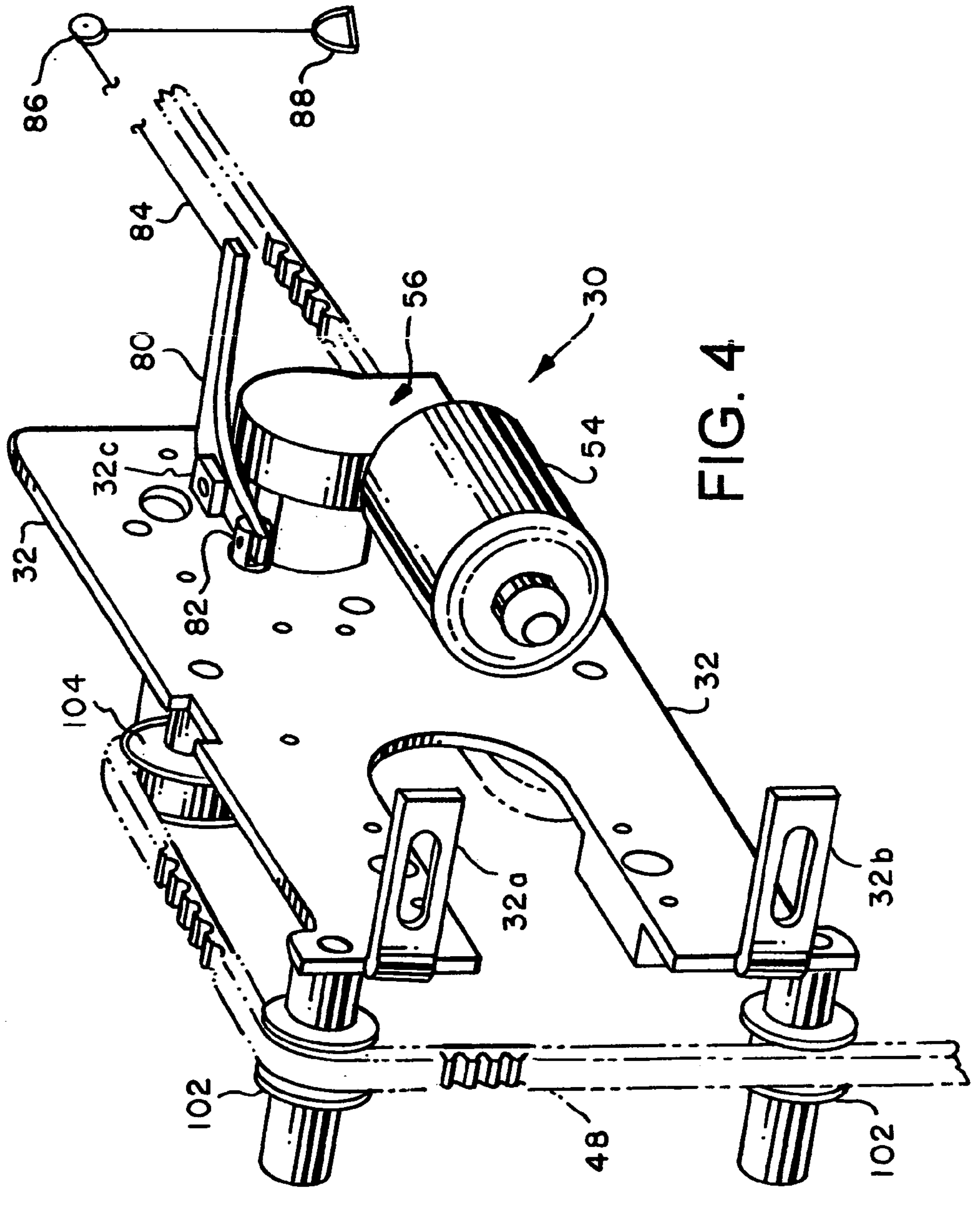
FIG. 4 is still another perspective view showing, further details of the embodiment of the operator illustrated in FIGS. 1, 2 and 3.

Referring further to FIG. 1, the barrier 20 is controlled for movement between open and closed positions by a motorized operator, generally designated by the numeral 30, which is mounted on a suitable bracket 32 characterized by an elongated substantially flat metal plate having suitable support tabs 32*a* and 32*b* formed thereon and extending at right angles, see FIG. 4, to the plane of the major plate-like portion of the support bracket. Operator support bracket 32 is mounted adjacent to and may be secured at least partially to a so called header bracket 34 which may partially support the track assembly 26 and also provide support for an elongated rotatable counterbalance shaft 36 supported at one end by bracket 34 and adapted to support for rotation therewith a flexible counterbalance cable drum 38. The opposite side of barrier 20 is also provided with a header bracket 40, FIG. 1, which is a substantial mirror image of the bracket 34, and is adapted to support the opposite end of the shaft 36 and a second cable drum 39 supported on the shaft 36 for rotation therewith and in a conventional manner. Cable drums 38 and 39 are operable to receive and dispense elongated flexible counterbalance cables 41 and 43, respectively. Counterbalance shaft 36 is connected to a torsion coil spring 44 which is sleeved over the shaft, is connected at a connector or cone 45, to the shaft at one end and connected to a suitable spring torque adjustment mechanism 46 at the opposite end, which adjustment mechanism is also, preferably, fixed to header bracket 40.

Figure 2:
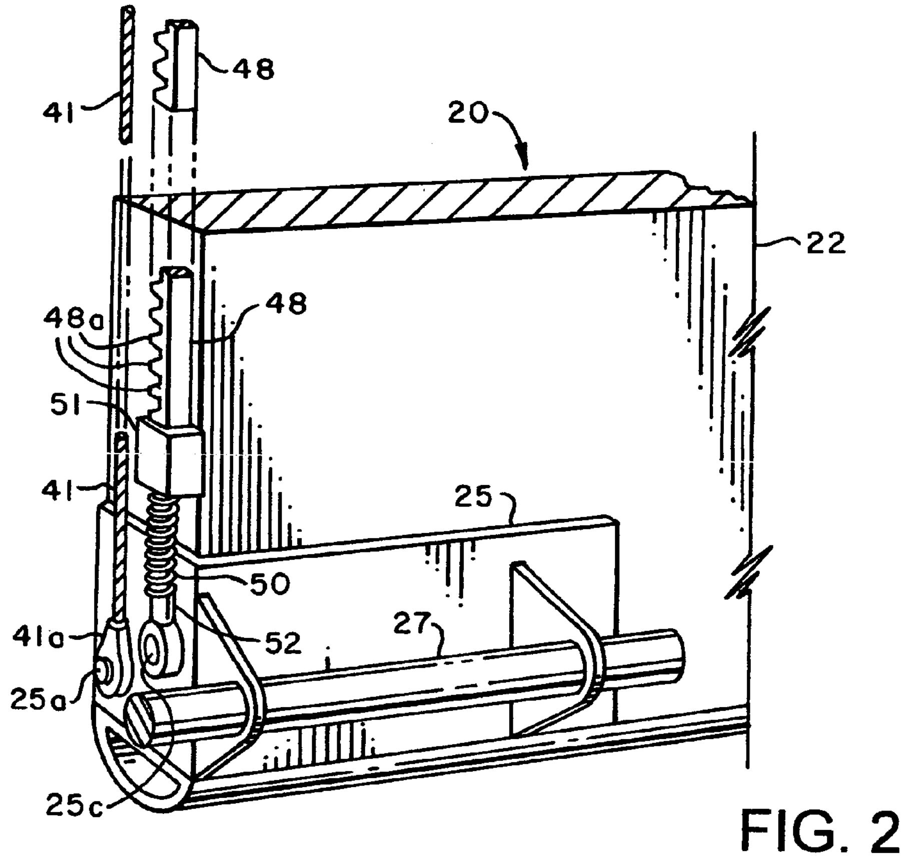
FIG. 2 is a detail perspective view showing a typical connection between the operator flexible drive member and the lowermost section of the door shown in FIG. 1.

Referring still further to FIGS. 1 and 2, the door panels 22 are supported in and guided within the track assemblies 26 and 28 by conventional roller type guide members 23 mounted on the respective panels on opposite lateral sides thereof. FIG. 2 illustrates the left corner of the lowermost panel 22, with reference to FIG. 1, wherein a roller guide support bracket 25 is provided for supporting a shaft member 27 which in turn is adapted to support a roller 23, not shown in FIG. 2. FIG. 2 illustrates a portion of the counterbalance cable 41, including its distal end, suitably connected to a solid thimble 41*a*, for example, and which, in turn, is connected to a cylindrical pin or boss 25*a* on bracket 25. FIG. 2 also illustrates one end portion of an elongated flexible belt drive member 48 which is part of the operator 30. Drive member 48 is preferably a toothed or cog type flexible belt including spaced apart cogs or teeth 48*a*, as shown in FIG. 2, and as will be further described herein. As further shown in FIG. 2, belt 48 includes an end fitting or connector member 51 connected to a coil extension spring 50 which, in turn, is connected to a fitting 52. Fitting 52 may be connected to the guide member support bracket 25 at a cylindrical pin or boss 25*c* suitably secured to bracket 25. Alternatively, fittings 51 and 52 may be connected to each other directly or belt 48 may be connected at the end shown in FIG. 2 to another end fitting to be described herein in connection with FIG. 14 of the drawing.

Figure 5:
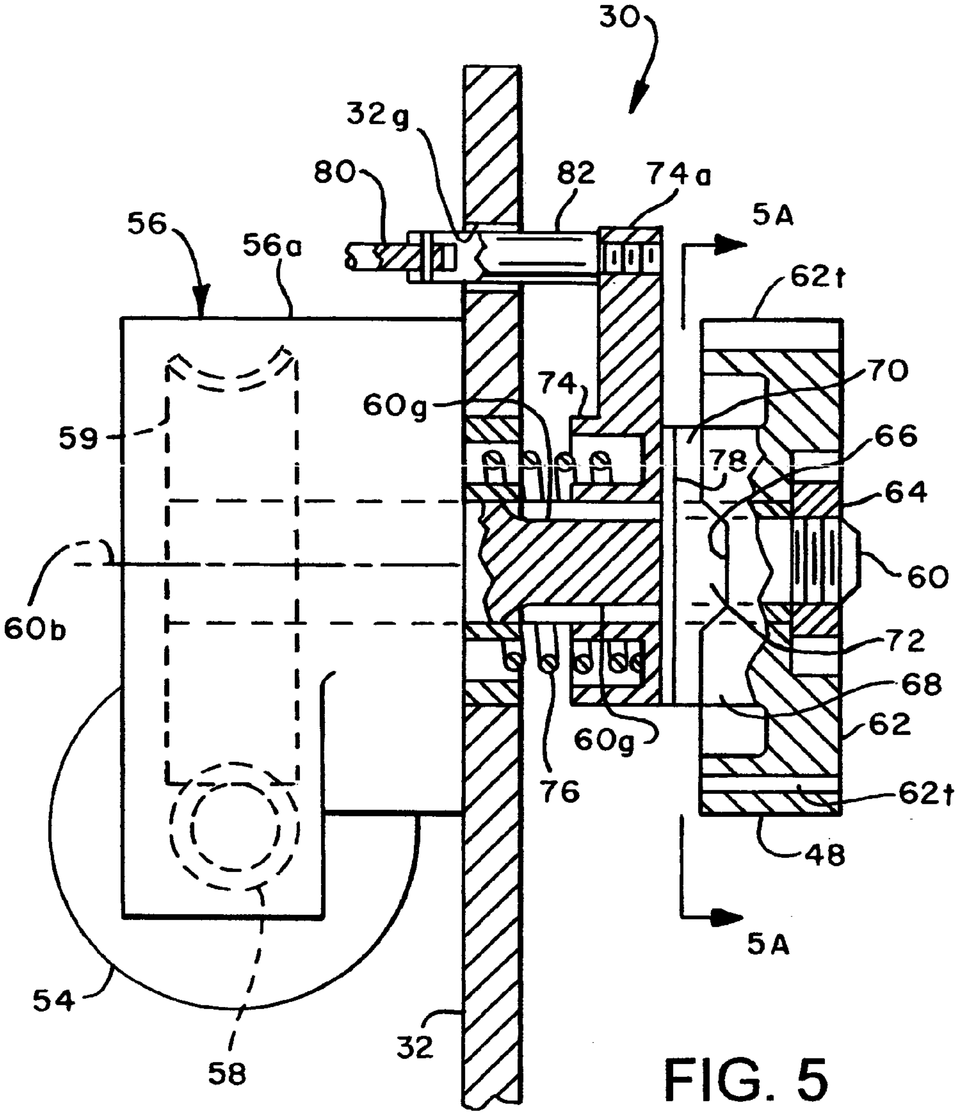
FIG. 5 is a detail section view taken generally along the line 5-5 of FIG. 3.

Referring now primarily to FIGS. 3, 3A, 4 and 5, the door operator 30 is further characterized by an electric drive motor 54, FIG. 4, drivably connected to and supported on a right angle speed reduction gear drive unit 56, preferably comprising a worm gear type drive unit characterized by a worm 58, FIG. 5, drivenly connected to the motor 54 and meshed with a worm gear 59. As further shown in FIG. 5, the gears 58 and 59 are disposed for rotation in a suitable housing 56*a* of the drive unit 56. Housing 56*a* also supports a rotatable output shaft 60. Motor 54 and drive unit 56 are suitably mounted on the operator support bracket or plate member 32, as illustrated.

Figure 5A:
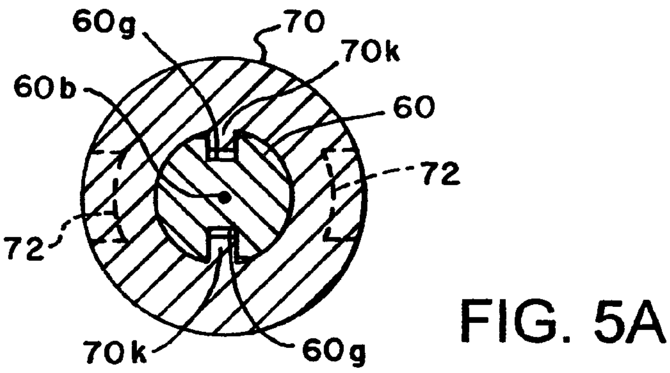
FIG. 5A is a detail section view taken along line 5A-5A of FIG. 5.

Referring further to FIG. 5, output shaft 60 supports a drive pulley comprising a belt engaging cog wheel 62 which is secured on the shaft 60 by a suitable retainer, such as a nut 64, whereby cog wheel 62 is adapted to be capable of rotation relative to shaft 60. Cog wheel 62 is drivingly engaged with belt 48 by way of circumferentially spaced cogs or teeth 62*t*, FIGS. 5 and 6, in a conventional manner. Operator 30 also includes a clutch mechanism whereby cog wheel 62 includes one or more trapezoidal shaped recesses 66, one shown in FIG. 5, formed circumferentially spaced apart on a generally cylindrical hub part 68 of cog wheel 62 and operable to be engaged with a generally cylindrical clutch member 70 mounted on shaft 60 and suitably keyed to the shaft for rotation therewith but also axially slidable on the shaft. For example, shaft 60 may include axial keyways 60*g*, FIG. 5A, for receiving in sliding engagement, cooperating keys 70*k* formed on clutch member 70. Clutch member 70 includes one or more trapezoidal shaped projections or dogs 72, one shown in FIG. 5, circumferentially spaced and engageable with the cog wheel 62 at the one or more recesses 66 formed in the hub 68 of the cog wheel. A clutch actuator member 74 is also mounted on shaft 60 whereby shaft 60 may rotate relative to the actuator member and the actuator member is axially slidable on shaft 60 against the bias of a coil spring 76. A suitable thrust bearing or washer 78 is interposed the actuator member 74 and the clutch member 70. Accordingly, cog wheel 62 may be drivenly connected to shaft 60 when the components including the clutch actuator member 74 and the clutch member 70 are in the positions shown in FIG. 5. However, in response to movement of the clutch actuator member 74 on shaft 60 axially to the left, viewing FIG. 5, clutch member 70 may also move axially to the left to disengage from the cog wheel 62 and allow the cog wheel to rotate relative to shaft 60. When clutch actuator member 74 is released, coil spring 76 biases the clutch actuator member and clutch member 70 toward the cog wheel 62 wherein the clutch projections or dogs 72 engage the cog wheel in the recess or recesses 66. Those skilled in the art will recognize that two or more clutch dogs 72 may be provided on the member 70 spaced about shaft axis of rotation 60*b* and engageable in corresponding recesses in the cog wheel hub 68. Thanks to the trapezoidal shape of the clutch dogs 72 and the recesses 66, at a predetermined resistance to rotation of the cog wheel 62, the clutch member 70 may be biased to the left, viewing FIG. 5, to disengage from the cog wheel, when required, thereby allowing the cog wheel to rotate relative to shaft 60.

Figure 6:
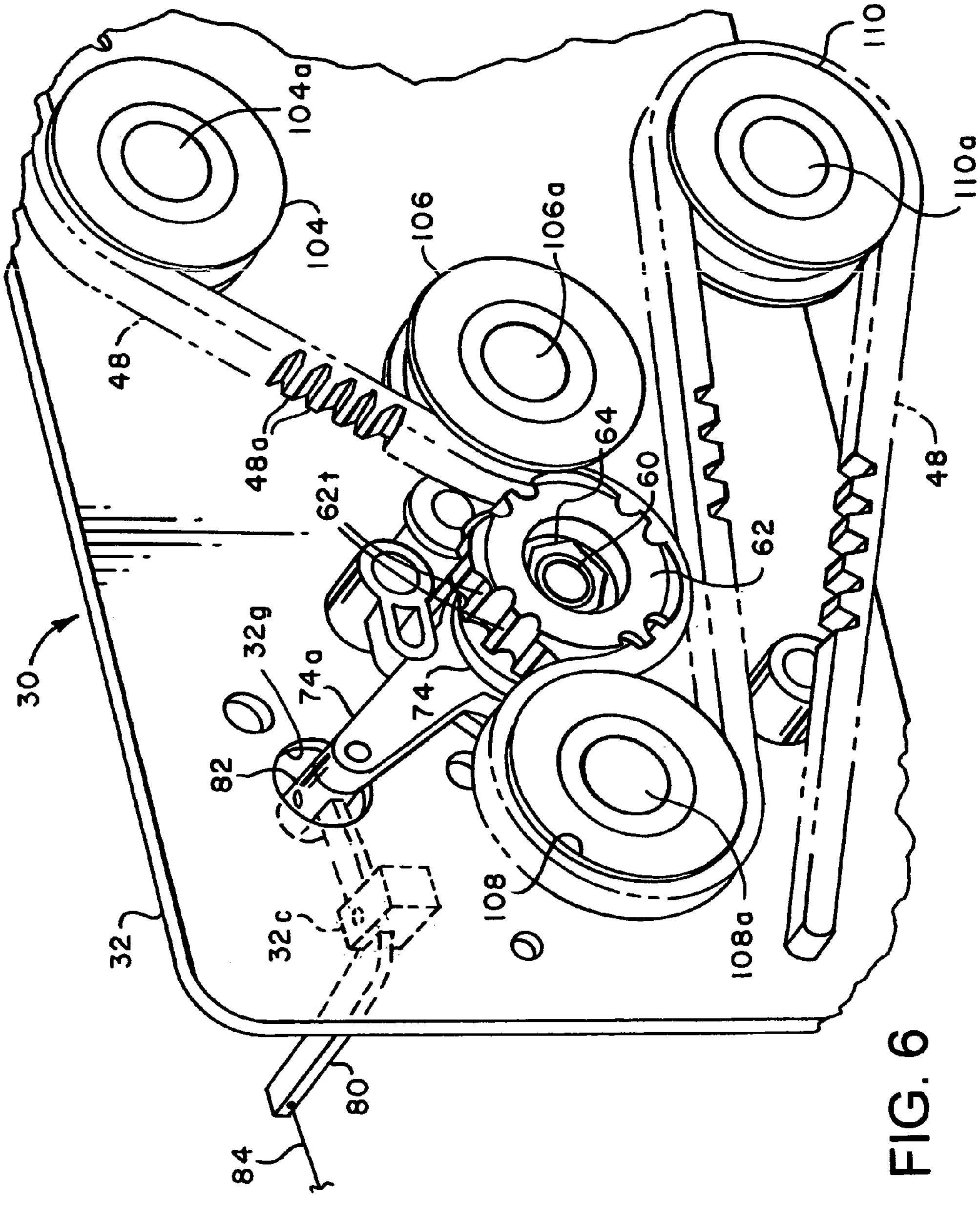
FIG. 6 is yet another perspective view of the operator illustrated in FIGS. 1, 2, 3, 3A, 4 and 5.

The axially movable clutch actuator member 74 is connected to a lever arm 80, FIGS. 4 and 6, mounted for pivotal movement on the support bracket or plate 32 at a clevis 32*c*, FIGS. 4 and 6, and connected to the actuator member by a suitable link 82 which projects through an opening 32*g* in bracket 32, FIGS. 5 and 6. Lever arm 80 is also connected to a flexible cable or rope member 84 suitably trained over a guide pulley 86 and terminating in a pull handle 88, FIG. 4, whereby in an emergency or a loss of electrical power, the operator 30 may be disengaged from a drive connection between the motor 54 and the belt 48 to permit manual movement of the barrier or door 20 between open and closed positions. Thanks to the provision of the coil spring 76, the clutch actuator member 74 is normally biased to maintain the clutch member 70 engaged with the cog wheel 62 so that a driving relationship is provided between the motor 54 and the belt 48.

Figure 3A:
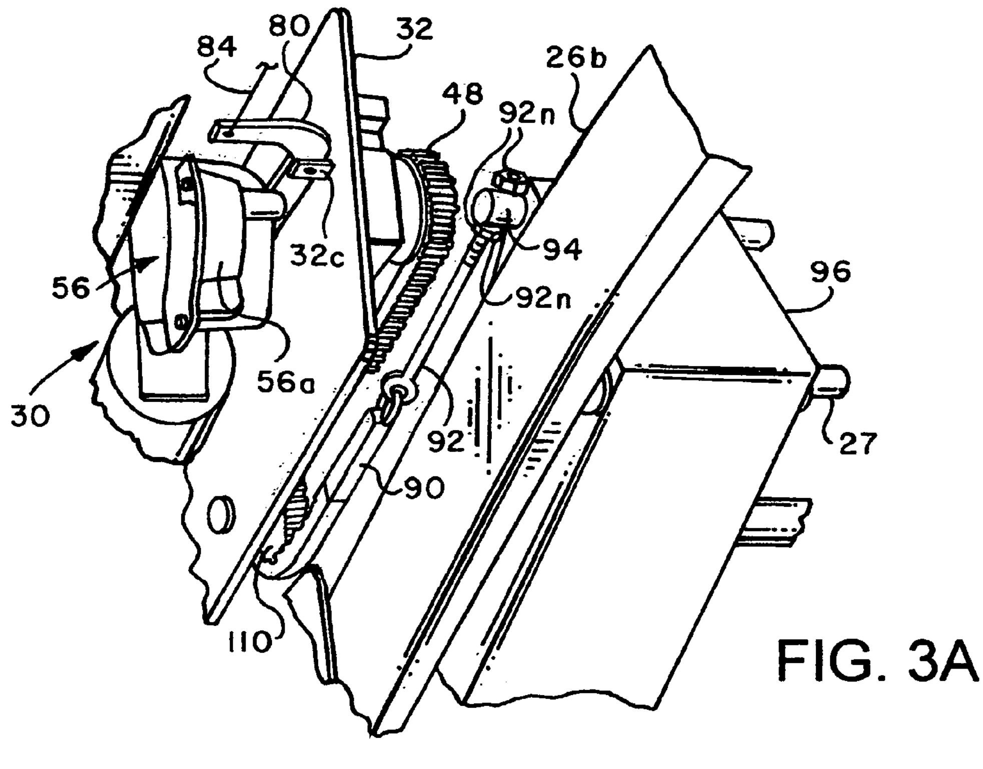
FIG. 3A is another perspective view of the embodiment shown in FIG. 3 showing a member for connecting the flexible drive member to a drawbar.
Figure 3:
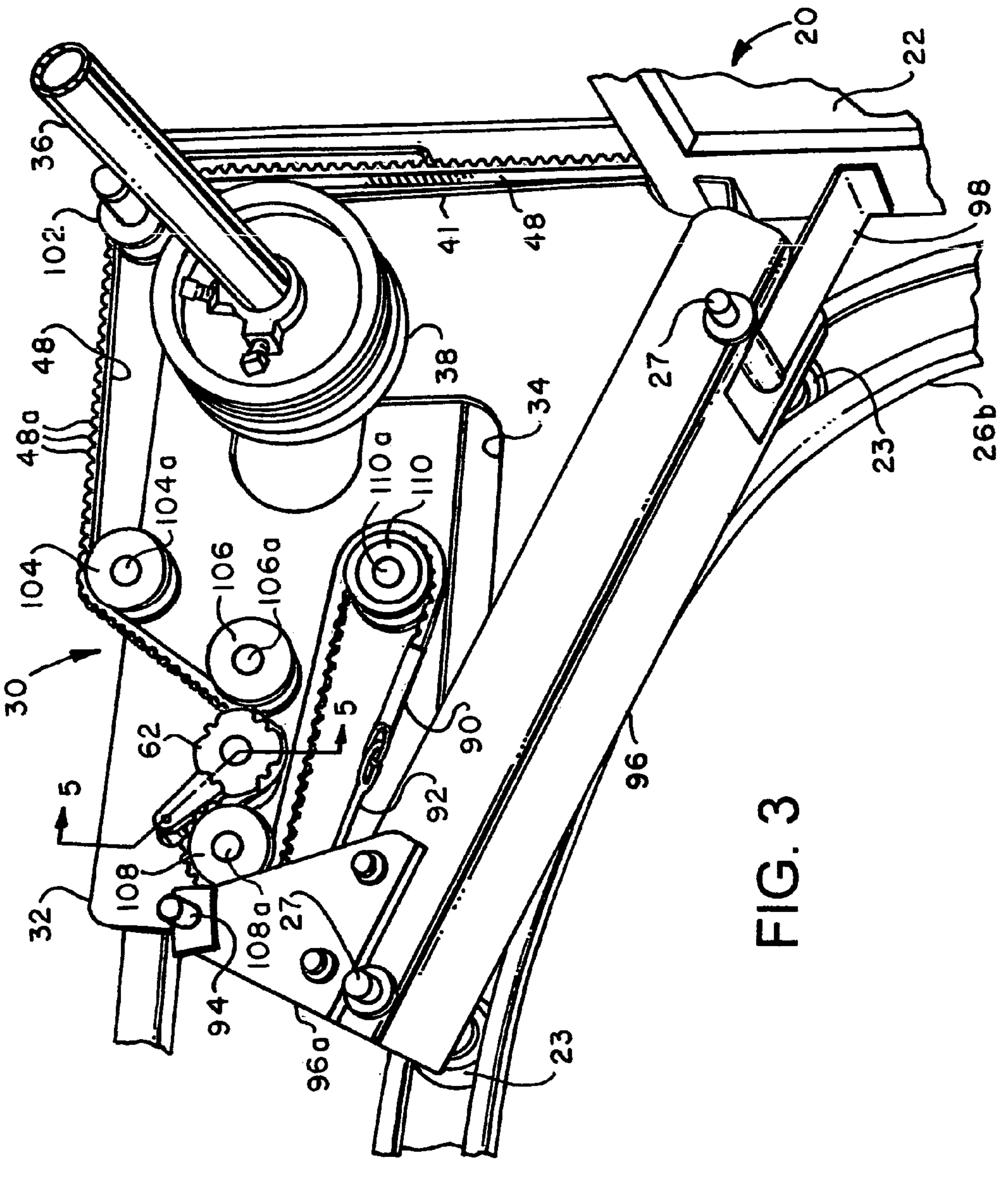
FIG. 3 is a perspective view of one preferred embodiment of a barrier operator in accordance with the invention.

As shown in FIGS. 3 and 3A, the end of the belt 48 opposite the end connected to the lowermost panel 22, is secured to a suitable connector or fitting part 90, FIG. 3, which, in turn, is connected to a connector part comprising a threaded eyebolt 92 suitably connected to a pin 94 mounted on a drawbar 96. Connector part 92 projects through a suitable transverse opening or bore in pin 94 and is adjustably secured thereto by spaced apart nuts 92*n*, FIG. 3A. Pin 94 is mounted on an arm 96*a* of drawbar 96. Drawbar 96 is supported by spaced apart guide rollers 23 disposed in track section 26 of track assembly 26 in the position shown in FIG. 3. A hinge connection is provided between drawbar 96 and the uppermost door panel 22 of the door 20, FIG. 3, which connection is provided by a substantially flat plate member 98 suitably secured to the uppermost door panel 22 and to an axle pin 27 for the guide roller 23 at the end of the drawbar 96 opposite the end which is adjacent the point of connection of the belt 48 to the drawbar. The drawbar connector or fitting 92 also provides for some adjustment of tension in the belt 48 between the point of connection of the belt to the drawbar 96 and the cog wheel 62 and provided by the adjustable nuts 92*n* threaded on rod-like fitting 92 and engaged with pin 94, FIG. 3A.

Referring further to FIGS. 3, 4 and 6, the operator 30 is also characterized by a series of guide and idler pulleys for training the belt 48 over the cog wheel 62 between the opposite ends of the belt which are operably connected to the door 20. In particular, a vertically extending portion of the belt 48 is trained over spaced apart guide pulleys 102 mounted for rotation on operator support plate 32, see FIG. 4, then belt 48 is trained over a guide pulley 104, FIG. 3, mounted for rotation on plate 32. Pulley 104 may be mounted for limited movement on plate or bracket 32 and biased by a spring to provide tensioning of belt 48. Alternatively, a spring biased belt tensioning pulley may be mounted on support bracket 32 and engaged with belt 48 at a point between pulleys 102 and 104. Belt 48 is maintained in driven engagement with cog wheel 62 by suitable spaced apart guide pulleys 106 and 108 mounted generally aligned with each other and inline with the cog wheel 62, as shown in FIG. 3. Belt 48 is trained over guide wheel or pulley 108 and then an idler pulley 110, FIG. 3, prior to the point of connection with drawbar 96 at the fitting 90. One or more of the guide wheels or pulleys 104, 106, 108 and 110 may be adjusted with respect to their positions supported on the support plate or bracket, 32 to adjust tension in the belt 48, as illustrated and described with respect to the embodiment shown in FIG. 7 through 9, for example. Pulleys 104, 106, 108 and 110 are suitably mounted for rotation on respective shaft means 104*a*, 106*a*, 108*a* and 110*a*, FIG. 6, and supported on support plate 32. In fact, in all embodiments of the invention described herein, one or more of the idler or guide or pulleys for the flexible belt of the operator embodiments may be supported for adjustment to adjust the tension in the flexible belt drive member.

In response to operation of the motor 54, the belt 48 is driven by the cog wheel 62 rotating in a clockwise direction, viewing FIG. 3, in a direction to lift and open the door 20 by placing tension on that portion of the belt between the cog wheel 62 and the point of connection of the belt to the bottommost panel 22 of the door 20, as shown in FIG. 2. As the door 20 is lifted by the belt drive connection between the cog wheel 62 and the door, and the belt 48 traverses through the operator 30, the drawbar 96 moves along the track sections 26*b* and 26*c* to the door open position assisted by the energy stored in the counterbalance spring 44. Of course, when the motor 54 is operated in the reverse direction, the cog wheel 62 is rotated in a counterclockwise direction, viewing FIG. 3, to place tension on that portion of the belt 48 between the cog wheel 62 and the fitting 92 to pull the barrier or door 20 toward the closed position. The weight of the door 20 assists in the closing motion and energy is restored to the counterbalance spring 44. Thanks to the configuration of the belt drive operator 30, a relatively quiet door opening and closing cycle is accomplished with an operator that requires minimum maintenance, is operable in a wide variety of environmental conditions and is also operable to oppose any unwanted effort to forcing of the door between closed and open positions. This last mentioned feature is provided by the cog belt 48, cog wheel 62 and the anti-backdrivability of the worm gear speed reduction drive unit 56. Moreover, the support plate or bracket 32 is adapted to support the pulleys 104, 106, 108, 110 and the cog wheel 62 such that the operator 30 may be mounted on the opposite side of door 20 adjacent support bracket 40. Drawbar 96 is also adapted to be mounted in guide track assembly 28.

Figure 7:
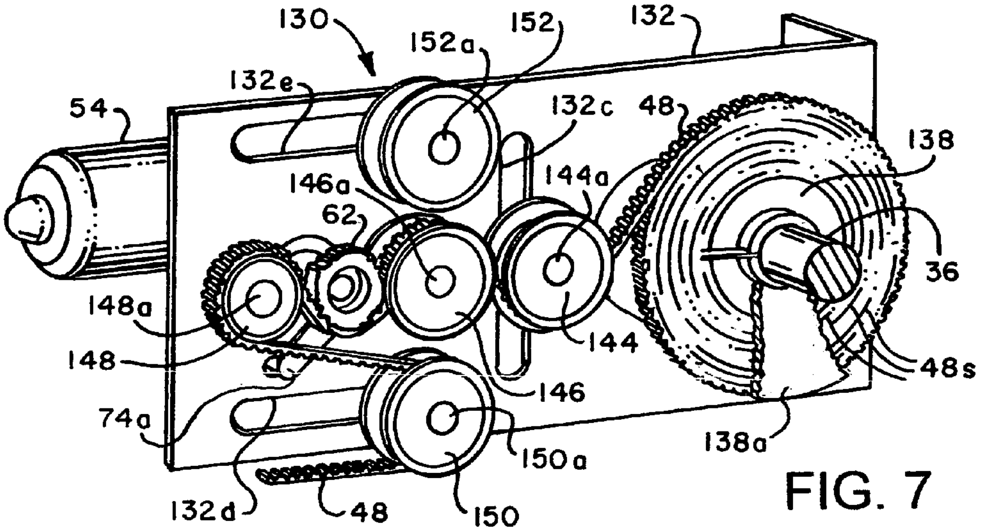
FIG. 7 is a perspective view of another preferred embodiment of a barrier operator in accordance with the invention.
Figure 8:
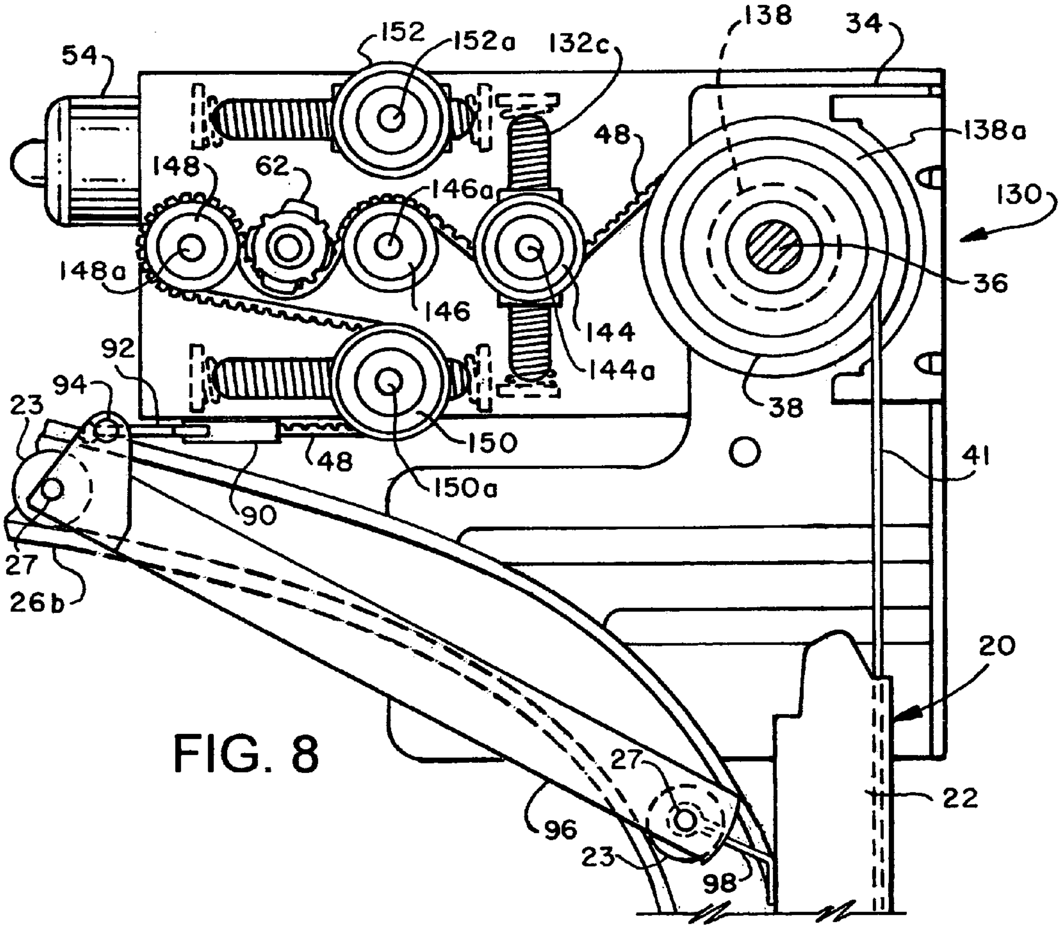
FIG. 8 is a perspective view of the operator shown in FIG. 7.
Figure 9:
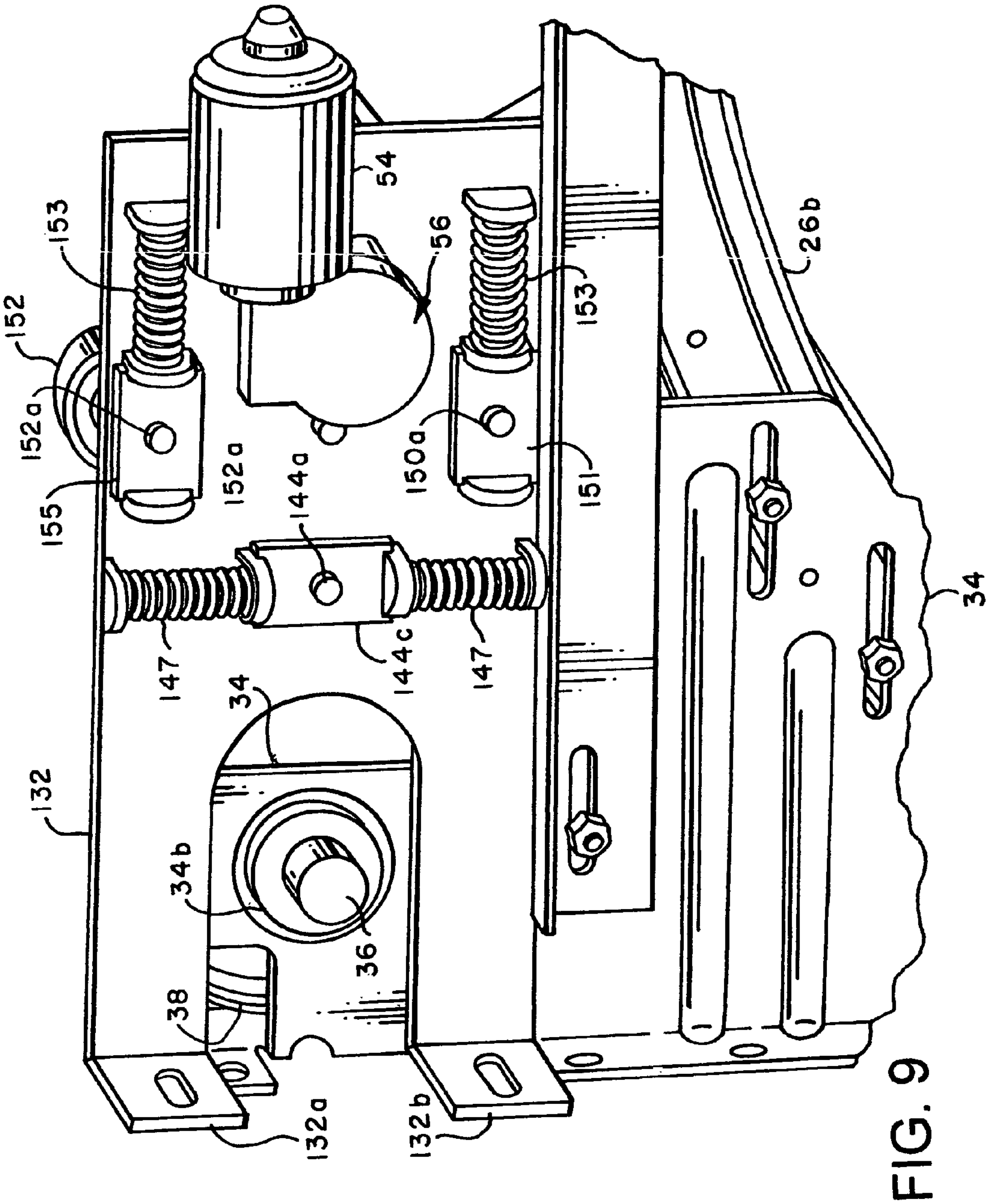
FIG. 9 is a perspective view of the opposite side of the operator shown in FIGS. 7 and 8.

Referring now to FIGS. 7, 8 and 9, another preferred embodiment of a barrier operator in accordance with the invention is illustrated and generally designated by the numeral 130. The operator 130 is similar in some respects to the operator 30 and includes a plate-like support bracket 132 similar to the bracket or support plate 32 and provided with suitable wall mounting tabs 132*a* and 132*b*, FIG. 9. Operator support bracket 132 is adapted to be mounted adjacent header bracket 34 which supports counterbalance shaft 36 for rotation in suitable bearing means 34*b*, FIG. 9. In the operator 130, the belt 48 is adapted to be reeled onto and off of a storage or take-up reel 138, FIGS. 7 and 8, which is mounted on and fixed for rotation with counterbalance shaft 36 and is preferably disposed adjacent the counterbalance cable drum 38, as shown in FIG. 8. In FIG. 7, cable drum 38 and header bracket 34 have been omitted for clarity. Accordingly, the belt storage reel 138 is preferably mounted on shaft 36 between the support plate 132 and the cable drum 38 which is connected to counterbalance cable 41, as shown in FIG. 8. Storage reel 138 is preferably provided with spaced apart circular flanges 138*a*, one shown in FIGS. 7 and 8, for guiding the successive spiral wraps 48*s*, FIG. 7, of belt 48 stored on the reel.

The operator 130 also includes a series of idler or guide pulleys for training the belt 48 with respect to the storage reel 138 and the connection between the belt and the drawbar 96. Adjustable tensioning or guide pulleys 144, 146, 148 and 150 are disposed, as shown, on the support bracket plate 132. A spare tensioning and guide pulley 152 is mounted on the bracket plate 132 opposite the pulley 146 from the pulley 150 and may be operable for training the belt 48 when the operator 130 is mounted on the opposite side of the door 20, if desired.

As shown primarily in FIG. 9, tensioning pulley 144 is mounted for rotation on an axle or shaft 144*a* which projects through a slot 132*c*, FIG. 7, in support bracket plate 132, FIG. 7, and is supported on a bearing plate 144*c*, FIG. 9. Bearing plate 144*c* is engaged with opposed coil compression springs 147 suitably supported on support plate 132 and which may be adapted to be adjusted to bias the tensioning roller 144 in one of two opposite directions generally parallel to the longitudinal extent of slot 132*c* to thereby adjust the tension on the belt 48 as it is reeled onto and off of the reel 138. In like manner, tensioning pulley 150 is supported for rotation on a shaft 150*a* which projects through a slot 132*d* in plate 132, FIG. 7, and is supported on a bearing plate 151, FIG. 9, engaged with an adjustable coil spring 153 for biasing the pulley 150 to the right, viewing FIG. 7, to also control tension on the belt 48. Spare pulley 152 is also supported on a shaft 152*a* projecting through a slot 132*e*, FIG. 7, and supported on a bearing plate 155, FIG. 9, which is also biased by a coil compression spring 153 for operation when the guide and tensioning pulley 152 is used in place of the pulley 150. Guide pulleys 146 and 148 may be mounted on shafts 146*a* and 148*a*, FIG. 7, supported on plate 132 in fixed positions. In the operator 130, the belt 48 is connected to the drawbar 96, generally in the same manner as in the embodiment shown in FIGS. 1 through 6, that is via connector parts 90 and 92.

In the operation of the operator 130, when the barrier or door 20 is moving toward the closed position, the shaft 36 rotates in a clockwise direction, viewing FIGS. 7 and 8, causing the storage reel 138 to rotate in the same direction and wind the belt 48 thereon, at least with regard to that portion of the belt connected at one end to the pulley 138 and disposed between the pulley and the idler or tensioning pulley 144, which assists in maintaining tension on the belt. Accordingly, as the door 20 is moved toward the closed position, the cog wheel 62 rotates in a counterclockwise direction, viewing FIGS. 7 and 8, and the shaft 36 is rotated in a clockwise direction, viewing FIGS. 7 and 8, by the counterbalance cables 41 and 43 as the door 20 moves generally downwardly while the belt 48 pulls the door toward the closed position via the drawbar 96. When the operator motor 54 is energized in the opposite direction of rotation of the cog wheel 62, the belt 48 is pulled off of the reel 138 which effects rotation of the shaft 36 and at least assists in winding of the counterbalance cables 41 and 43 on their respective drums 38 and 39 while the opposite end of the belt 48 is paid out. Suitable tension is maintained on the belt 48 by way of the pulleys 144 and 150 or 152, thanks to the tensioning mechanism provided by the coil springs 147 and 153 acting on the bearing plates 144*c*, 151 and 155, respectively. In essentially most other respects, the operator 130 is substantially like the operator 30.

Figure 10:
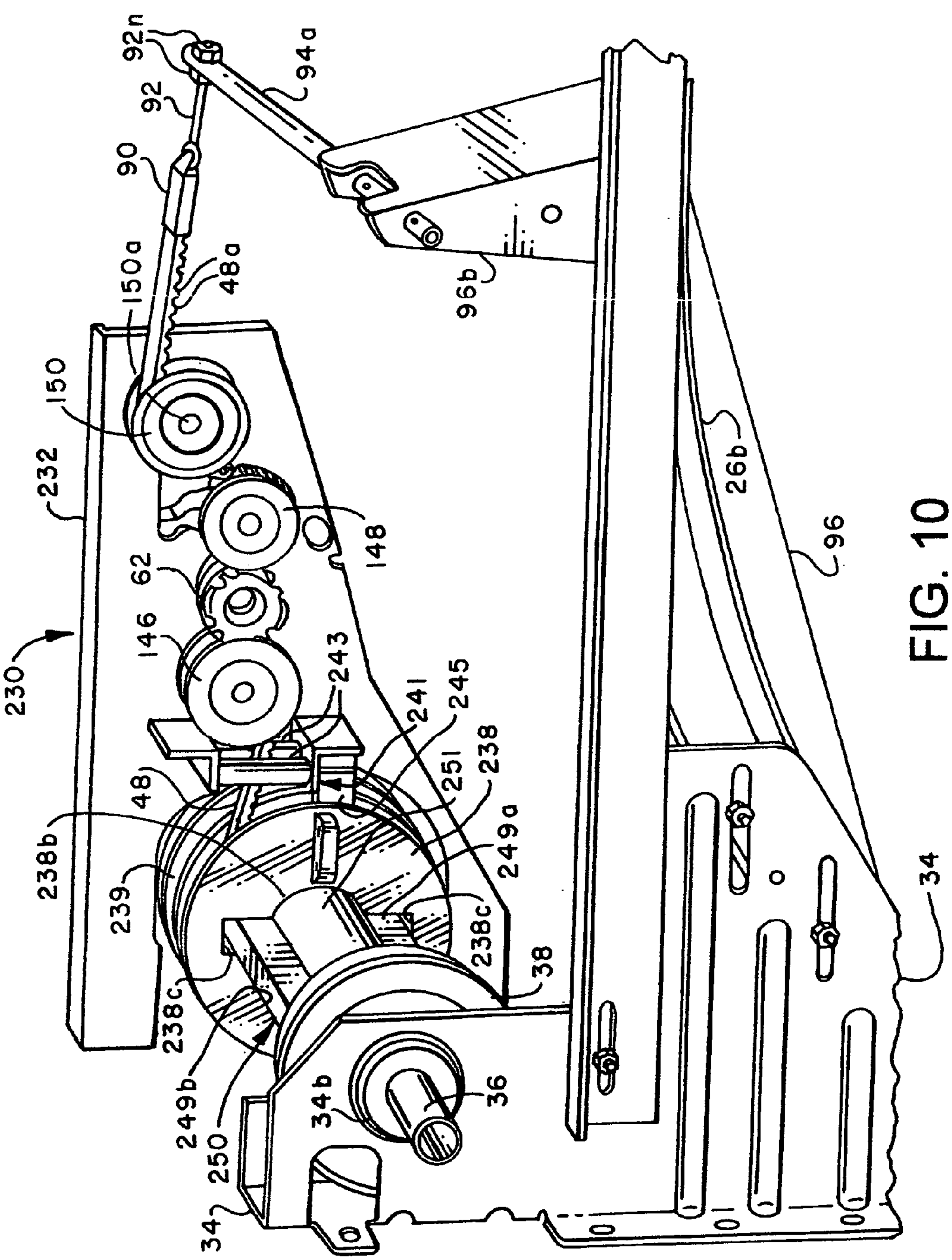
FIG. 10 is a perspective view of another preferred embodiment of a barrier operator in accordance with the invention.
Figure 11:
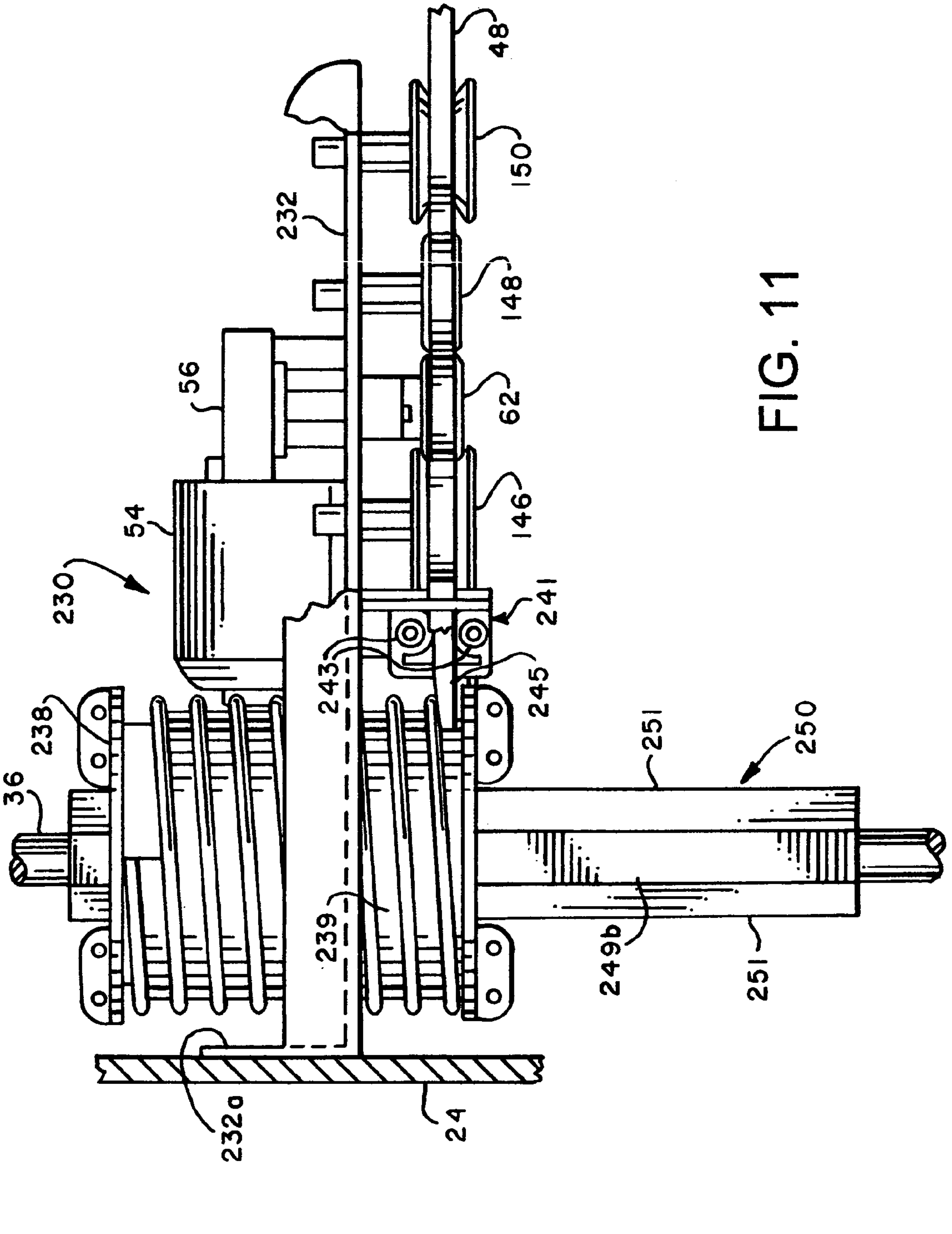
FIG. 11 is a top plan view of the operator shown in FIG. 10.
Figure 12:
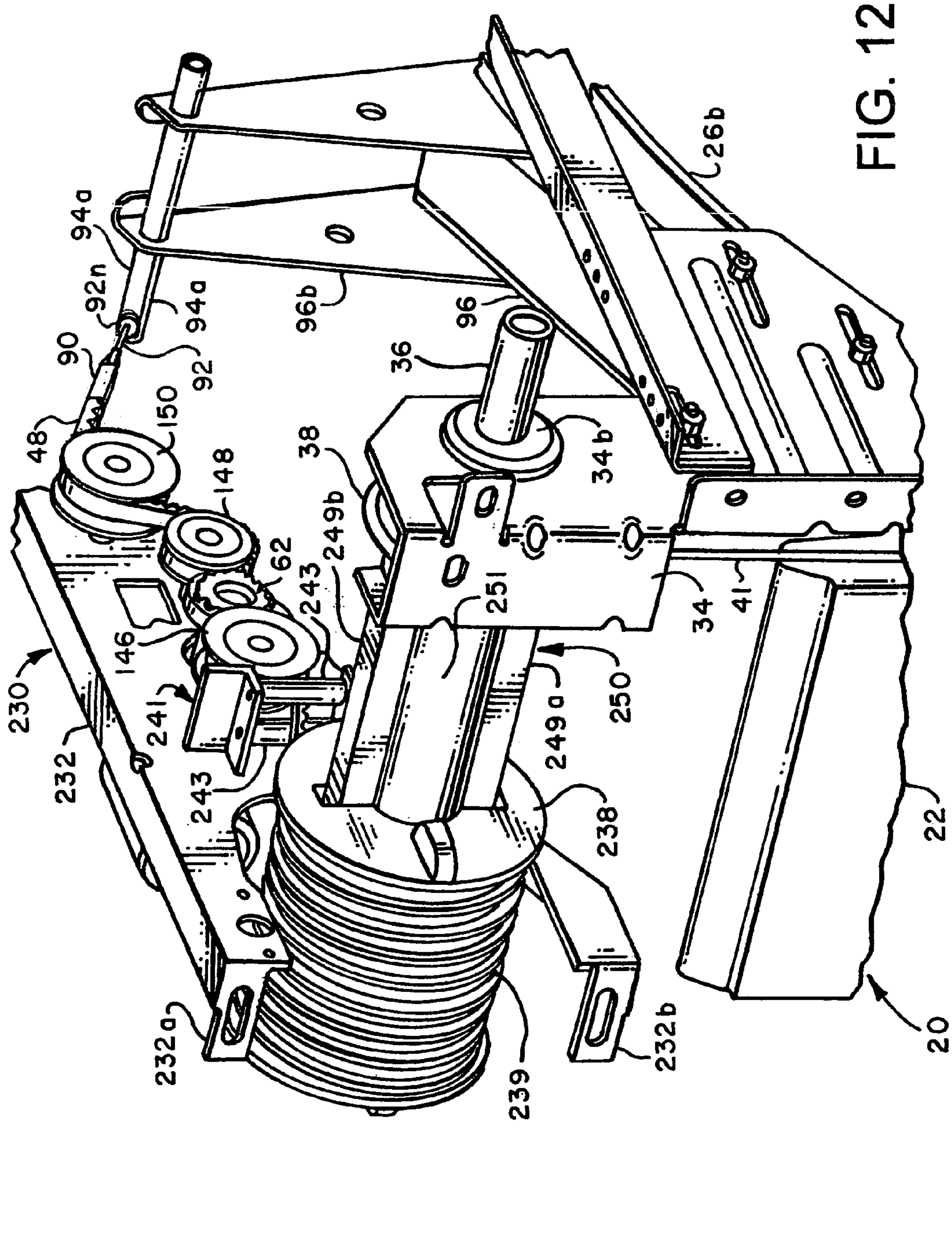
FIG. 12 is another perspective view of the operator shown in FIGS. 10 and 11.

Referring now to FIGS. 10, 11 and 12, another preferred embodiment of a barrier operator in accordance with the invention is illustrated and generally designated by the numeral 230. The operator 230 is also adapted to function in conjunction with the door support structure including spaced apart header brackets 34 and 40 with the header bracket 34 being shown supporting one end of the counterbalance shaft 36 in bearing 34*b*. In all embodiments, the shaft 36 is supported at its opposite end by header bracket 40 and in suitable bearing means corresponding to bearing 34*b*. The drawbar 96 is shown partially in drawing FIGS. 10 and 12 and is connected to one end of the drive belt 48 in the same manner as for the operators 30 and 130. However, a somewhat elongated connecting pin 94*a* is utilized in the operator 230 in place of the pin 94 used for the operators 30 and 130 and a modified arm 96*b* of drawbar 96 supports pin 94*a*. The operator 230 includes a modified plate-like support bracket 232 for supporting the drive motor 54 and gear reduction drive unit 56 for driving the cog wheel 62, see FIG. 11. The operator 230 also includes a belt tensioning and guide pulley arrangement similar to the operator 130 comprising guide pulleys 146 and 148 and a tensioning pulley 150, see FIG. 10 also, which may be mounted on the support bracket plate member 232 in the same manner as these pulleys are mounted on the plate member 132 for the operator embodiment 130 illustrated in FIGS. 7 and 8. The belt 48 is also connected to the drawbar 96 in the manner described above and generally the same as for the operators 30 and 130. However, instead of attaching the opposite end of the belt 48 to the door 20, the belt is wound onto and off of a storage reel 238 which is mounted on and for axial sliding movement with respect to the shaft 36 but is also operable for rotation with the shaft 36.

As shown in FIGS. 10, 11 and 12, the belt storage reel 238 is provided with a spiral groove 239 formed thereon and of a width sufficient to receive the belt 48, the belt 48 being suitably attached at one end to the reel 238. The belt 48 is trained through a guide 241 suitably mounted on the support plate or bracket 232 and including spaced apart rollers 243 which are spaced a distance slightly greater than the width of the belt 48. An elongated finger 245 is mounted on the guide 241, FIG. 11, and projects into the spiral groove 239 so that, when the reel 238 is rotated, it is forced to translate axially due to the interaction between the finger 245 and the sidewalls of the reel 238 defining the groove 239, as illustrated.

As shown in FIGS. 10 and 12, the storage reel 238 is provided with a hub portion 238*b* including opposed axial extending keyways or slots 238*c* which receive oppositely projecting substantially rectangular cross-section integral key members 249*a* and 249*b* of an elongated bearing member 250, which is mounted axially fixed on shaft 36 and also for rotation therewith. Bearing member 250 supports reel 238 for axial sliding movement thereon while the reel 238 rotates with the bearing member 250 and the shaft 36. Opposed arcuate bearing portions 251 are formed on the bearing member 250 in addition to the elongated rectangular cross section keys 249*a* and 249*b*. The bearing member 250 may be formed of a suitable self-lubricating material, such as filled nylon, for example.

Accordingly, in the operation of the operator 230, energization of the motor 54 to cause rotation of the cog wheel 62 in one direction will cause the belt 48 to unreel from the storage reel 238 while effecting rotation of the counterbalance shaft 36 and winding of the counterbalance cables 41 and 43 on to the respective drums 38 and 39 to raise the door 20 toward its open position while the belt 48 is also paid out to allow the drawbar 96 to move along the horizontal track portion 26*c*. As the belt storage reel 238 rotates, it also translates axially thanks to the guide finger 245 residing in the spiral groove 239. When the drive motor 54 rotates the cog wheel 62 in the opposite direction for moving the barrier or door 20 toward a closed position, the counterbalance cables 41 and 43 will effect rotation of the shaft 36 as they unreel from the drums 38 and 39 causing rotation of the shaft 36 and storage reel 238 while the reel 238 undergoes axial translation along shaft 36 in the opposite direction and belt 48 is wound onto the reel and stored in the continuous spiral groove 239.

Referring now to FIG. 13, there is illustrated yet another preferred embodiment of a belt or flexible drive member barrier operator in accordance with the invention and generally designated by the numeral 330. The operator 330 is similar to the operator 30 in many respects, as indicated by the reference numerals in FIG. 13. However, the guide pulley 104 of the operator 30 has been replaced by a tensioning pulley 334 which is supported by a clevis type bracket 336 connected to a support rod 338. Support 338 is disposed for sliding movement in a bearing housing 340 mounted on bracket support plate 32. The axially slidable support rod 338 is provided with a threaded distal end over which a rotatable threaded member or nut 342 is provided and bearing against a washer 344 for retaining a coil compression spring 346 between the washer and the bearing block 340. Compression of the spring 346 may be adjusted by the position of the nut 342 on the threaded portion of rod 338. In this way an axial bias force acting on the rod 338 in a direction to the left, viewing FIG. 13, may be applied to the tensioning pulley 334 for tensioning the flexible drive member or belt 48, as shown in FIG. 13. In FIG. 13 the header bracket 34, shaft 36 and cable drum 38 have been omitted in the interest of clarity. As mentioned above, in essentially all other respects, the operator 330 is substantially like the operator 30 and control of same may be carried out in a conventional manner utilizing an operator controller and motor controls, similar to those described in, for example, U.S. Pat. No. 6,118,243 to Reed et al. and assigned to the assignee of the present invention.

Referring briefly to FIG. 14, an alternate embodiment of tensioning means for tensioning the flexible drive belt 48 is illustrated. In the arrangement illustrated in FIG. 14, the pin 94 connected to the drawbar arm 96*a* is illustrated with its bore 94*e* for slidably accommodating a modified eyebolt connector member 92*c*. Eyebolt 92*c* includes externally threaded portions 92*t* for receiving threaded nuts 92*n* bearing against retainer washers 92*w* and also retaining opposed coil springs 92*s* between the pin 94 and the respective nuts 92*n*. In the arrangement illustrated in FIG. 14, tension on the belt 48 may be adjusted by adjusting the compression of the springs 92*s* by the position of the nuts 92*n* on the shank portion of the eyebolt 92*c* as illustrated. The eyebolt connector member 92*c* is also provided with a suitable head part 92*h* for connection to the connector member 90 for the belt 48. The arrangement illustrated in FIG. 14 can also be applied to the opposite end of the belt 48 whereby the pin 94 would be replaced by a stub pin connected to the side edge of the lowermost door section 22 and provided with a bore for slidably receiving the threaded shank portion of the eyebolt 92*c*, as illustrated in FIG. 14.

Preferred embodiments of a barrier operator in accordance with the invention have been described hereinabove in sufficient detail, it is believed, to enable one skilled in the art to practice the invention. Conventional engineering materials and fabrication techniques used in the manufacture of barrier operators, such as conventional residential or commercial garage door operators, may be utilized in fabricating, assembling and controlling operation of the operator embodiments 30, 130, 230 and 330, respectively.

Moreover, although preferred embodiments of the invention have been described in detail herein, those skilled in the art will also recognize that various substitutions and modifications may be made without departing from the scope and spirit of the appended claims.

What is claimed is:

1. An operator for moving a barrier between open and closed positions on spaced apart guide tracks, said barrier being operably connected to a counterbalance mechanism for at least partially balancing the weight of said barrier when moving between said positions, said operator comprising:

an elongated flexible member operably connected at one end to said barrier at substantially a lower end thereof and an opposite end of said flexible member being operably connected to said barrier adjacent an upper end thereof;

an operator support disposed generally above said barrier and adjacent one of said guide tracks; and a motor operably supported by said operator support and drivably connected to a drive mechanism drivably engaged with said flexible member for moving said barrier between open and closed positions, wherein said flexible member is disposed at least partially around at least one tensioning pulley to facilitate drivable engagement between said drive mechanism and said flexible member.

2. The operator set forth in claim 1 wherein:

said flexible member comprises an elastomeric belt.

3. The operator set forth in claim 2 wherein:

said belt comprises a cog belt.

4. The operator set forth in claim 2 wherein:

said drive mechanism includes a drive pulley operably engaged with said belt for driving said belt in one direction to move said barrier toward an open position and for driving said belt in the opposite direction to move said barrier toward a closed position.

5. The operator set forth in claim 4 including:

the at least one tensioning pulley mounted on said operator support and engaged with said belt for maintaining a predetermined tension thereon.

6. The operator set forth in claim 5 including:

at least a second tensioning pulley mounted on said operator support and operable to maintain a predetermined tension on at least a portion of said flexible member.

7. The operator set forth in claim 5 wherein:

said tensioning pulley is operably engaged with a spring for biasing said tensioning pulley to apply a predetermined tension to said flexible member.

8. The operator set forth in claim 1 wherein:

said one end of said flexible member is connected to said lower end of said barrier by way of an elastically deflectable device.

9. The operator set forth in claim 8 wherein:

said elastically deflectable device is a coil spring.

10. The operator set forth in claim 8 wherein:

said flexible member is connected at said opposite end to a drawbar supported in one of said guide tracks and connected to an upper end of said barrier.

11. The operator set forth in claim 1 wherein:

said counterbalance mechanism comprises a rotatable shaft supporting spaced apart cable drums for storing and unwinding elongated counterbalance cables connected to said barrier adjacent a lower end thereof; and said operator includes a storage reel mounted on said counterbalance shaft for rotation therewith, said one end of said flexible member being connected to and adapted to be stored on said storage reel in successive coils and for unwinding from said storage reel in response to said barrier moving from a closed position to an open position.

12. The operator set forth in claim 11 wherein:

said storage reel includes a spiral groove for receiving successive coils of said flexible member for storage thereon.

13. The operator set forth in claim 12 wherein:

said storage reel is mounted for axial movement on said shaft.

14. The operator set forth in claim 13 including:

a storage reel bearing member mounted on said shaft for rotation therewith and supporting said storage reel for axial sliding movement thereon while requiring said storage reel to rotate with said bearing member and said shaft.

15. The operator set forth in claim 13 including:

a guide member disposed on said operator support for guiding said flexible member between said storage reel and said drive mechanism.

16. The operator set forth in claim 1 wherein:

said drive mechanism includes a drive pulley engaged with said flexible member and a clutch disposed in said drive mechanism between said motor and said drive pulley for releasing driving engagement of said motor with said drive pulley.

17. An operator for moving a barrier between open and closed positions on spaced apart guide tracks, said barrier being operably connected to a counterbalance mechanism for at least partially balancing the weight of said barrier when moving between said positions, said counterbalance mechanism including a rotatable counterbalance shaft supporting spaced apart cable drums for storing and unwinding elongated counterbalance cables connected to said barrier adjacent a lower end thereof, said operator comprising:

an elongated flexible cog belt operably connected at one end to said barrier adjacent an upper end thereof;

an operator support disposed generally above said barrier and adjacent one of said guide tracks;

a motor operably supported by said operator support and drivably connected to a drive mechanism including a cog wheel drivably engaged with said belt for moving said barrier to the open position and to the closed position; and a storage reel mounted on said counterbalance shaft for rotation therewith, an opposite end of said belt being connected to said storage reel, wherein said belt is adapted to be stored on said storage reel in successive coils and unwound from said storage reel in response to said barrier moving between closed and open positions.

18. The operator set forth in claim 17 wherein:

said storage reel includes a spiral groove for receiving successive coils of said belt for storage thereon.

19. The operator set forth in claim 18 wherein:

said storage reel is mounted for axial movement on said shaft.

20. The operator set forth in claim 19 including:

a storage reel bearing member mounted on said shaft for rotation therewith and supporting said storage reel for axial movement thereon while requiring said storage reel to rotate with said bearing member and said shaft.

21. The operator set forth in claim 17 including:

at least one tensioning pulley mounted on said operator support and engaged with said belt for maintaining a predetermined tension thereon.

22. The operator set forth in claim 21 wherein:

said at least one tensioning pulley is operably engaged with a spring for biasing said at least one tensioning pulley to apply a predetermined tension to said belt.

23. The operator set forth in claim 17 wherein: said drive mechanism includes a clutch operably disposed between said motor and said cog wheel and operable for releasing driving engagement between said motor and said cog wheel.

24. The operator set forth in claim 23 including:

linkage connected to said clutch and disposed for actuation for releasing said clutch from driving engagement between said motor and said drive pulley.

25. In an operator for moving a barrier between open and closed positions on spaced apart guide tracks;

a rotatable shaft supporting drum means for storing and unwinding at least one elongated flexible member connected to said barrier adjacent a lower end thereof;

an elongated flexible drive member operably connected at one end to said barrier adjacent an upper end thereof;

an operator support;

a motor operably supported by said operator support and drivably connected to a drive mechanism including a drive pulley drivably engaged with said drive member for moving said barrier to the open position and the closed position; and drive member storage means mounted on said shaft for rotation therewith, wherein an opposite end of said drive member is operatively connected to said drive member storage means, said drive member being adapted to be stored on said storage means in successive coils and unwound from said storage means in response to said barrier moving between closed and open positions.

26. The operator set forth in claim 25 wherein:

said storage means includes a groove for receiving successive coils of said drive member for storage thereon.

27. The operator set forth in claim 26 wherein:

said storage means is mounted for axial movement on said shaft.

28. The operator set forth in claim 27 including:

a bearing member mounted on said shaft for rotation therewith and supporting said storage means for axial movement thereon while requiring said storage means to rotate with said bearing member and said shaft.

29. The operator set forth in claim 25 including:

at least one tensioning pulley mounted on said operator support and engaged with said drive member for maintaining a predetermined tension thereon.

30. The operator set forth in claim 25 wherein:

said drive mechanism includes a clutch disposed in said drive mechanism between said motor and said drive pulley and operable for releasing driving engagement between said motor and said drive pulley.

31. The operator set forth in claim 25 wherein:

said flexible member is connected to a drawbar operably connected to said barrier by way of a connection including a pin connected to said drawbar, a rod-like shank of a fitting slidably connected to said pin and adjustable spring means interposed said shank and said pin for adjusting tension on said flexible member.

* * * * *